United States Patent
Chen et al.

(10) Patent No.: US 11,069,341 B2
(45) Date of Patent: Jul. 20, 2021

(54) SPEECH CORRECTION SYSTEM AND SPEECH CORRECTION METHOD

(71) Applicant: Quanta Computer Inc., Taoyuan (TW)

(72) Inventors: Yi-Ling Chen, Taoyuan (TW); Chih-Wei Sung, Taoyuan (TW); Yu-Cheng Chien, Taoyuan (TW); Kuan-Chung Chen, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 193 days.

(21) Appl. No.: 16/242,325

(22) Filed: Jan. 8, 2019

(65) Prior Publication Data
US 2020/0090639 A1  Mar. 19, 2020

(30) Foreign Application Priority Data

Sep. 13, 2018  (TW) ................. 107132155

(51) Int. Cl.
*G10L 15/06* (2013.01)
*G06F 16/61* (2019.01)
*G10L 15/07* (2013.01)

(52) U.S. Cl.
CPC ............ *G10L 15/063* (2013.01); *G06F 16/61* (2019.01); *G10L 15/07* (2013.01); *G10L 2015/0636* (2013.01)

(58) Field of Classification Search
CPC ........... G10L 2015/0636; G10L 15/063; G10L 15/07
See application file for complete search history.

(56) References Cited

U.S. PATENT DOCUMENTS

2009/0281789 A1* 11/2009 Waibel .................... G06F 40/40
704/3
2015/0112674 A1* 4/2015 Zhang ................... G10L 15/063
704/235

FOREIGN PATENT DOCUMENTS

CN       103578467 A      1/2017

OTHER PUBLICATIONS

Chinese language office action dated Jan. 6, 2020, issued in application No. TW 107132155.

* cited by examiner

*Primary Examiner* — Thomas H Maung
(74) *Attorney, Agent, or Firm* — McClure, Qualey & Rodack, LLP

(57) ABSTRACT

The speech correction system includes a storage device, an audio receiver and a processing device. The processing device includes a speech recognition engine and a determination module. The storage device is configured to store a database. The audio receiver is configured to receive an audio signal. The speech recognition engine is configured to identify a key speech pattern in the audio signal and generate a candidate vocabulary list and a transcode corresponding to the key speech pattern; wherein the candidate vocabulary list includes a candidate vocabulary corresponding to the key speech pattern and a vocabulary score corresponding to the candidate vocabulary. The determination module is configured to determine whether the vocabulary score is greater than a score threshold. If the vocabulary score is greater than the score threshold, the determination module stores the candidate vocabulary corresponding to the vocabulary score in the database.

7 Claims, 4 Drawing Sheets

SPEECH CORRECTION SYSTEM AND SPEECH CORRECTION METHOD

CROSS-REFERENCE TO RELATED APPLICATION

This application claims priority to Taiwan Application Serial Number 107132155, filed Sep. 13, 2018, which is herein incorporated by reference.

BACKGROUND

Technical Field

The present invention relates to a system for receiving speech, and in particular to a speech correction system and a speech correction method.

Description of the Related Art

In recent years, with the development of electronic devices such as mobile phones, tablets, car navigation systems and the like, there are more and more ways for users to enter information into electronic devices. For example, users can use voice signal to input information into electronic devices. Most traditional voice systems (such as the voice software developed by Google and Microsoft) are operated by a cloud server, an language analysis engine or model to determine the one or more vocabularies (i.e. the voice signal) that matches the voice command, and then ask the user whether the one or more vocabularies is correct that described by the user via user interface, thereby allowing the user to confirm whether the output is correct. If user confirms that the output is correct, the correct vocabulary is output directly. If the user confirms that all the corresponding vocabularies are wrong, the user are requested to input the correct vocabularies into the language analysis engine, and the speech analysis mechanism is retrained.

However, the disadvantage of the traditional voice system is that it is necessary to ask the user all the time to modify and improve the language analysis model, causing inconvenience to the user.

It can be seen that the above methods obviously still have inconveniences and defects, and need to be further improved.

BRIEF SUMMARY

An embodiment of the invention introduces a speech correction system. The speech correction system includes a storage device, an audio receiver and a processing device. The processing device includes a speech recognition engine and a determination module. The storage device is configured to store a database. The audio receiver is configured to receive an audio signal. The speech recognition engine is configured to identify a key speech pattern in the audio signal and generate a candidate vocabulary list and a transcode corresponding to the key speech pattern; wherein the candidate vocabulary list includes a candidate vocabulary corresponding to the key speech pattern and a vocabulary score corresponding to the candidate vocabulary. The determination module is configured to determine whether the vocabulary score is greater than a score threshold. If the vocabulary score is greater than the score threshold, the determination module stores the candidate vocabulary corresponding to the vocabulary score in the database. If all of the vocabulary scores in the candidate vocabulary list are not greater than the score threshold, the determination module stores the transcode in the database.

An embodiment of the invention introduces a speech correction method. The speech correction method comprises: receiving an audio signal, identifying a key speech pattern in the audio signal and generating a candidate vocabulary list and a transcode corresponding to the key speech pattern; and determining whether a vocabulary score is greater than a score threshold. The candidate vocabulary list comprises a candidate vocabulary corresponding to the key speech pattern and the vocabulary score corresponding to the candidate vocabulary. If the vocabulary score is greater than the score threshold, the candidate vocabulary corresponding to the vocabulary score is stored, and if all of the vocabulary scores in the candidate vocabulary list are not greater than the score threshold, the transcode is stored in a database.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
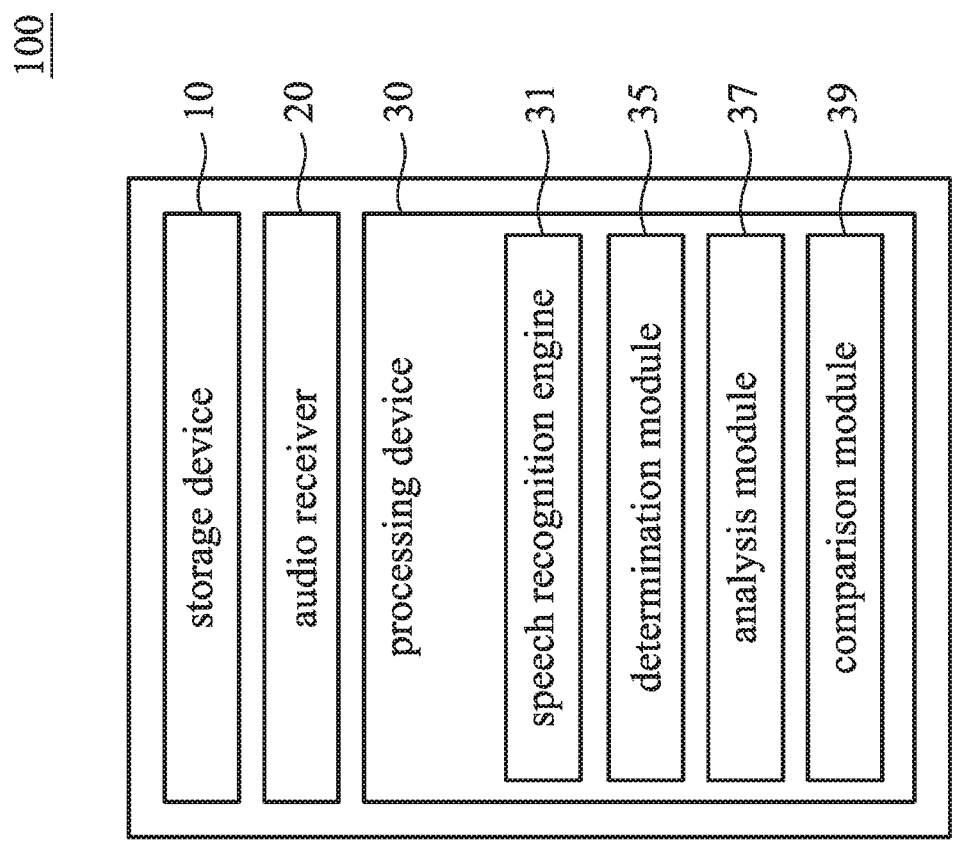
FIG. 1 illustrates speech correction system according to an embodiment of the invention.
Figure 2:
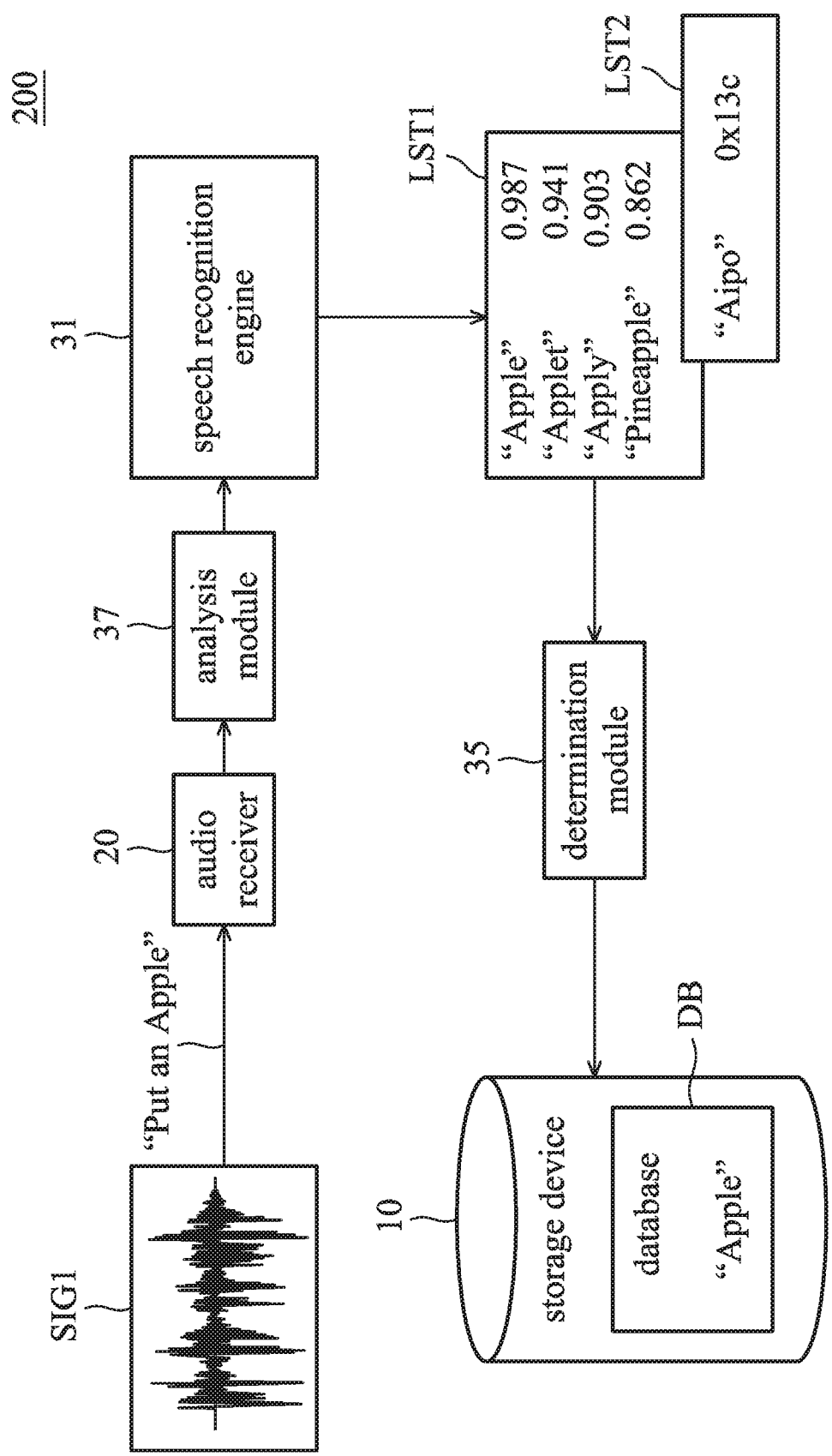
FIG. 2 is a schematic diagram illustrating a speech correction method according to an embodiment of the invention.
Figure 3:
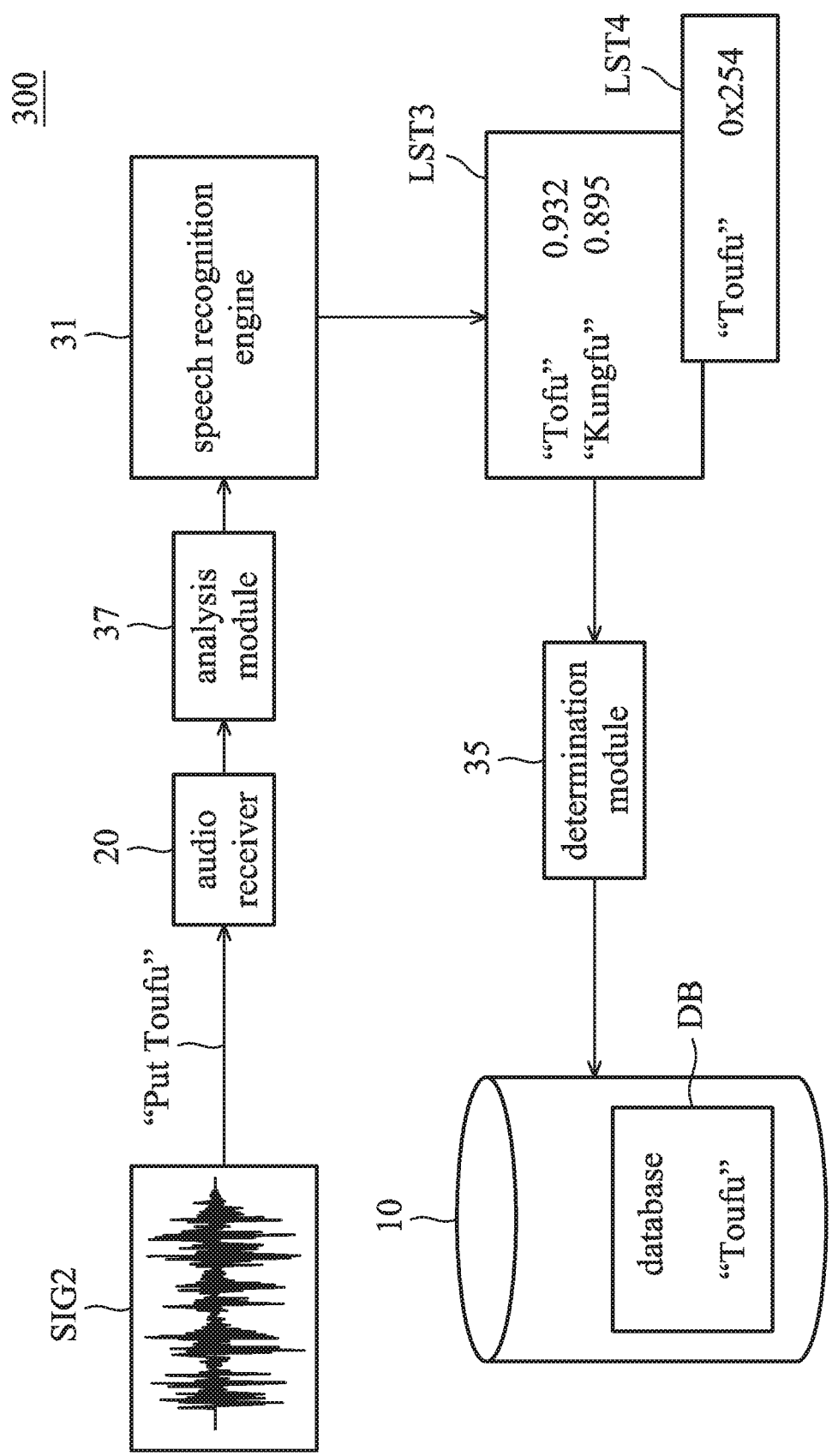
FIG. 3 is a schematic diagram illustrating a speech correction method according to an embodiment of the invention.

Please refer to FIGS. 1-3, FIG. 1 illustrates a speech correction system 100 according to an embodiment of the invention. FIG. 2 is a schematic diagram illustrating a speech correction method 200 according to an embodiment of the invention. FIG. 3 is a schematic diagram illustrating a speech correction method 300 according to an embodiment of the invention.

As shown in FIG. 1, the speech correction system 100 includes a storage device 10, an audio receiver 20 and a processing device 30. The processing device 30 includes a speech recognition engine 31 and a determination module 35. In one embodiment, the processing device 30 further includes an analysis module 37 and a comparison module 39.

In one embodiment, the storage device 10 can be implemented by a read-only memory, a flash memory, a floppy disk, a hard disk, an optical disk, a flash disk, a magnetic tape, a database accessible via a network, or a storage medium that can be easily conceived by those of ordinary skill in the art and has the same function. In one embodiment, the storage device 10 is used for storing database DB (as shown in FIG. 2).

In one embodiment, the audio receiver 20 uses for receiving an audio signal. In one embodiment, the audio receiver 20 can be a microphone or other device having similar function.

In one embodiment, the processing device 30 can be any electronic device having calculation function. In one embodiment, the speech recognition engine 31, the determination module 35, the analysis module 37 and the comparison module 39 can be individually or collectively implemented by, for example, a microcontroller, a microprocessor, a digital signal processor, an application specific integrated circuit (ASIC), or a logic circuit.

In one embodiment, referring to FIG. 2, the audio receiver 20 is configured to receive an audio signal for command SIG1 ("audio signal"), and the analysis module 37 is configured to receive the audio signal SIG1 from the audio receiver 20.

In this example, the audio signal SIG1 is "Put an Apple". When the audio receiver 20 receives the audio signal SIG1, the audio signal SIG1 is transmitted to the analysis module 37. Then the analysis module 37 performs pre-processing to obtain a key speech pattern. In one embodiment, the audio signal can include commands as well as key speech pattern. The command refers to the operation that the user wants to perform, which is firstly defined in the speech correction system 100. For example, the system developer defines and stores the commands in the storage device 10, e.g., "Put", "Get", "Open", etc. The key speech pattern is not predefined by the system. The key speech pattern refers to an object or target that the user wants the processing device 30 to perform the command. For example, "Apple", "Orange", "fridge". In other words, the key speech pattern can be a vocabulary other than the command "Put" in the audio signal.

In one embodiment, when the audio signal SIG1 is "open fridge", the meaning of the audio signal SIG1 is "enable" an application, such as a refrigerator management application. In one embodiment, the user can input the audio signal SIG1 through the refrigerator management application (e.g., the refrigerator management application installed in a mobile phone, tablet, computer, etc.). In one embodiment, the audio signal SIG1 may be a series of voices, such as "Put an Apple", "Put an Orange", "finish" ("finish" means to close the application). Thus, the user can record the type, behavior (i.e., command) and/or quantity of food in the refrigerator on their own electronic device (local terminal device, such as a mobile phone). However, the present invention is not limited to application to a refrigerator management system, and also can be applied to other management systems.

In one embodiment, the pre-processing on the audio signal SIG1 by the analysis module 37 could use known techniques, such as noise removing, syllables analyzing and sentences grouping, to extract the command and/or the key speech pattern, so it will not be described here.

Next, the key speech pattern is transmitted to the speech recognition engine 31. The speech recognition engine 31 is used to recognize the key speech pattern in the audio signal, and then generate a candidate vocabulary list LST1 and a transcode corresponding to the key speech pattern (for example, as shown in FIG. 2: "Aipo"). The candidate vocabulary list LST1 includes the candidate vocabularies corresponding to the key speech pattern (for example, "Apple", "Applet", "Apply" and "Pineapple", as shown in FIG. 2) and each of the candidate vocabularies has a corresponding vocabulary score (for example: "Apple" corresponds to a vocabulary score 0.987, "Applet" corresponds to a vocabulary score 0.941, "Apply" corresponds to a vocabulary score 0.903 and "Pineapple" corresponds to a vocabulary score 0.862). The higher the vocabulary score, the higher level the candidate vocabulary matches the key speech pattern.

In another embodiment, as shown in FIG. 3, the analysis module 37 receives another audio signal SIG2 from the audio receiver 20. In this example, the audio signal SIG2 is "Put Toufu" (the user may want to input a type of Chinese food called "doufu(豆腐)", pronounced "Toufu"). The analysis module 37 performs pre-processing on the audio signal SIG2 to obtain the command and/or the key speech pattern. Then, the key speech pattern is transmitted to the speech recognition engine 31. The speech recognition engine 31 is used to recognize the key speech pattern in the audio signal SIG2 and then generates a candidate vocabulary list LST3 and a transcode corresponding to the key speech pattern (for example, as shown in FIG. 3: "Toufu"). For example, the candidate vocabulary list LST3 may include the candidate vocabularies corresponding to the key speech pattern (for example, "Tofu" and "Kungfu", as shown in FIG. 3) and the corresponding individually vocabulary score (for example, the vocabulary score corresponding to "Tofu" is 0.932, and the vocabulary score corresponding to "Kungfu" is 0.895).

In one embodiment, the speech recognition engine 31 can be implemented by a known speech recognition program (for example, Google speech API, Microsoft Azure). The transcode can also be performed using a known speech recognition program.

In one embodiment, the speech recognition engine 31 includes at least one speech recognition program. In one embodiment, the transcode and the candidate vocabulary list LST1 may be generated by the same or different speech recognition programs.

In one embodiment, the transcode is provided by the way of Roman Pinyin or other natural language pinyin. The speech recognition engine 31 also generates a speech code corresponding to the transcode codes (for example, in FIG. 2, the speech code corresponding to the transcode "Apia" is "0x13c", and for another example, in FIG. 3, the speech code corresponding to the transcode "Toufu" is "0x254"). The generation of the speech code is helpful for programming.

In one embodiment, the transcode and the corresponding speech code shown in FIG. 2 can be stored in the transcode table LST2. In one embodiment, the transcode and its corresponding speech code shown in FIG. 3 can be stored in the transcode table LST4.

In one embodiment, the determination module 35 is configured to determine whether the vocabulary score is greater than a score threshold (for example, 0.95). If the vocabulary score is greater than the score threshold, the candidate vocabulary corresponding to the vocabulary score is stored in the database DB. If all the vocabulary scores in the candidate vocabulary list LST1 are not greater than the score threshold, the transcode is stored in the database DB.

In an example, as shown in FIG. 2, the speech correction system 100 sets the score threshold as 0.95, and the determination module 35 determines whether each vocabulary score in the candidate vocabulary list LST1 is greater than the score threshold. In the candidate vocabulary list LST1, the vocabulary score corresponding to "Apple" is 0.987 which is greater than the score threshold. Therefore, the determination module 35 stores "Apple" into the database DB.

In another example, as shown in FIG. 3, the speech correction system 100 sets the score threshold as 0.95, and the determination module 35 determines whether each vocabulary score in the candidate vocabulary list LST3 is greater than the score threshold. When the determination module 35 determines that all the vocabulary scores in the candidate vocabulary list LST3 are not greater than the score threshold, the determination module 35 stores the transcoding code "Toufu" into the database DB.

In one embodiment, the vocabulary candidate list LST1 includes a plurality of candidate vocabularies corresponding to the key speech pattern, and the candidate vocabulary each corresponds to a vocabulary score. The determination module 35 determines whether at least one of the vocabulary scores is greater than the score threshold. If the determination module 35 determines that at least one of the vocabulary scores is greater than the score threshold, the candidate vocabulary corresponding to the maximum of the scores greater than the score threshold is stored in the database DB.

For example, as shown in FIG. 2, the speech correction system 100 sets the score threshold as 0.90, and the vocabulary score corresponding to "Apple" in the candidate vocabulary list LST1 is 0.987, the vocabulary score corresponding to "Applet" is 0.941, and the vocabulary score corresponding to "Apply" is 0.903. Due to the three vocabulary scores are all greater than the score threshold (0.90), the determination module 35 would select the candidate vocabulary "Apple" corresponding to the maximum value of the vocabulary score greater than the score threshold (0.987) and stores the candidate vocabulary "Apple" into the database DB.

In one embodiment, when the audio receiver 20 receives a plurality of different audio signals, all the candidate vocabularies selected by the determination module 35 can be stored in the database DB. For example, firstly, the processing device 30 executes the process shown in FIG. 2 to get the determination output of "Apple". Then, the processing device 30 executes the process shown in FIG. 3 to get the determination output of "Toufu". The processing device 30 finally stores both output of "Apple" and "Toufu" in the database DB.

In one embodiment, the score threshold can be adjusted according to the actual system environment.

Figure 4:
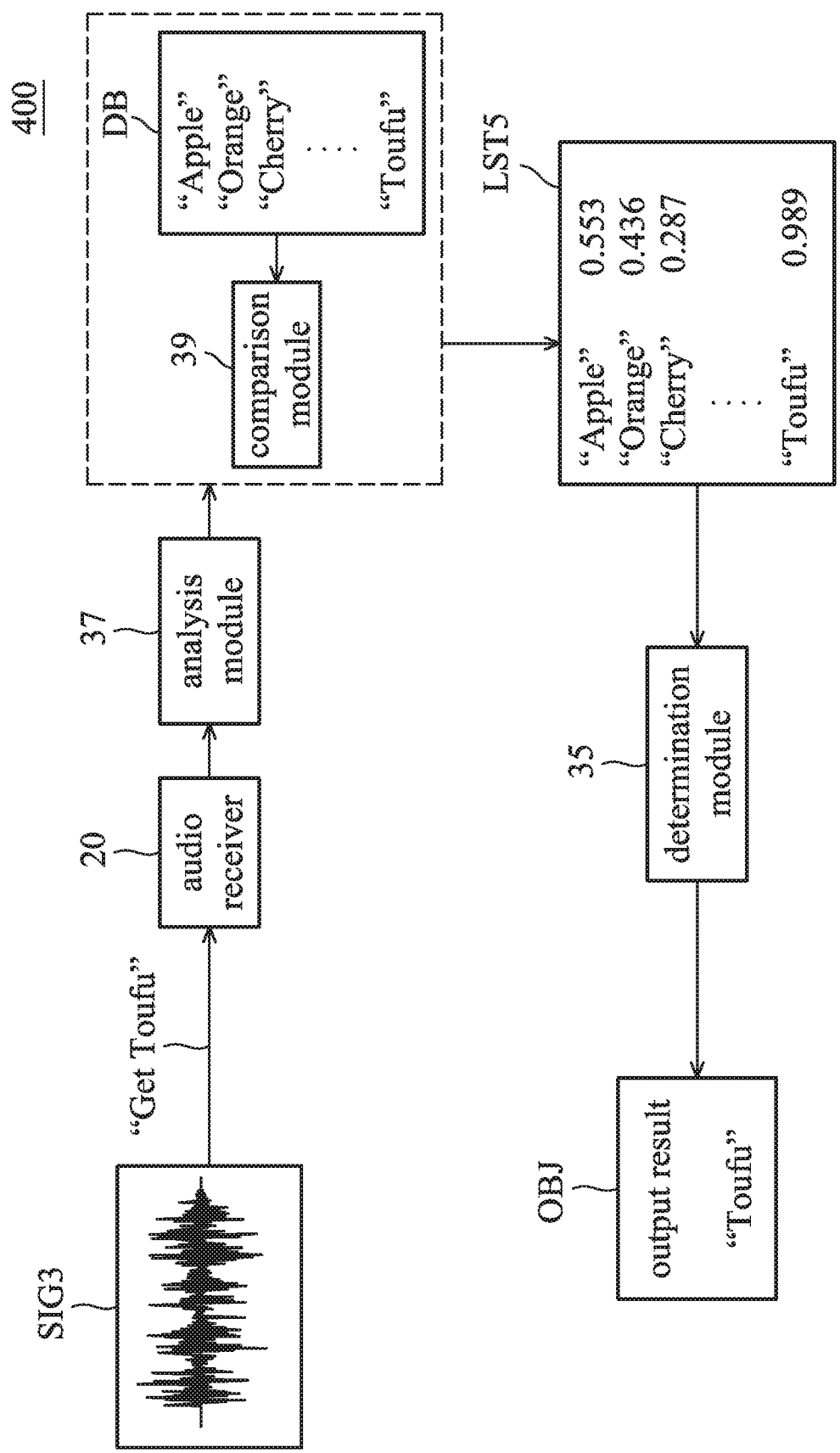
FIG. 4 is a schematic diagram illustrating a speech correction method according to an embodiment of the invention.

Next, please refer to FIG. 4, which is a schematic diagram illustrating a speech correction method 400 according to an embodiment of the invention. In FIG. 4, when the audio receiver 20 receives the audio signal SIG3, for example, "Get Toufu", the audio receiver 20 transmits the audio signal SIG3 to the analysis module 37 for performing pre-processing. After the analysis module 37 completes the pre-processing, the analysis module 37 transmits the key speech pattern to the comparison module 39. The comparison module 39 receives the key speech pattern and compares the key speech pattern with the candidate vocabularies and transcodes stored in database DB (i.e., all the vocabularies and the transcodes in the database DB, such as "Apple", "Orange", "Cherry" . . . "Toufu" shown in FIG. 4), to generate a comparison result list LST5. The comparison result list LST5 includes comparison scores individually corresponding to each of the candidate vocabularies and the transcode(s). For example, "Apple" corresponds to the comparison score as 0.553, "Orange" corresponds to the comparison score as 0.436, "Cherry" corresponds to the comparison score as 0.287 . . . , and "Toufu" corresponds to the comparison score as 0.989. Next, the determination module 35 determines whether each of the comparison scores is greater than a comparison threshold (for example, 0.95). In this example, only the comparison score that corresponds to "Toufu" (for example, 0.989) is larger than the comparison threshold (for example, 0.95), so the output result is "Toufu".

In another embodiment, if the comparison scores of vocabularies in the database DB (for example, 0.97, 0.98, and 0.99, respectively) are greater than the comparison threshold (for example, 0.95), the determination module 35 selects the vocabulary corresponding to the maximum value of the comparison score (i.e., 0.99) as the output result.

In one embodiment, the comparison threshold can be adjusted according to an actual system environment.

Therefore, when the user repeats the same key speech pattern, if the vocabulary corresponding to the key speech pattern has been stored in the database DB, the speech correction system 100 can quickly correspond to the correct output result, if the vocabulary corresponding to the key speech pattern has not been stored in the database DB, the speech correction method 200 described in FIG. 2 can be applied to define the new key speech pattern into the database DB.

In one embodiment, the speech correction method 200, 300 can be applied to an application of a mobile phone or other electronic products. For example, the speech correction method 200 and/or 300 can be applied to a refrigerator management application. When the user says "Put an Apple" to the mobile phone, the known fruit "Apple" can be written in the database DB. Even if the user says an unrecognizable phrase to the phone (for example, the user has an accent, or the vocabulary to be entered is relatively unpopular), the database DB can still store the transcode, such as "Toufu". Therefore, all the vocabulary that the speech correction system 100 can recognize or unrecognizable through the speech recognition engine 31 can be recorded in the database DB without requiring the user to confirm multiple times. In addition, when the user repeats the same key speech pattern, if the vocabulary corresponding to the key speech pattern has been stored in the database DB, the speech correction system 100 can quickly correspond to the correct output result.

The speech correction system and the speech correction method shown in the present invention can perform key speech pattern recognition accommodating different user's accent or new vocabularies when an audio signal is inputted. If the speech correction system does not recognize the vocabulary, the transcode would be stored, so the response of the speech correction system can be understood by other user. Since all vocabularies can be stored on the user's own electronic device, which is the local terminal device of the application, there is no need to compare the key speech pattern by uploading the key speech pattern to the cloud server. The speech correction system and the speech correction method can provide different user-defined speech vocabulary recognition effects. In addition, since it is not necessary to compare the key speech pattern by uploading the key speech pattern to the cloud server, it is only necessary to compare the key speech pattern with the contents of the database at the local terminal device of the application, thereby improving the efficiency of comparing the key speech pattern and the vocabulary.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A speech correction system, comprising:
a storage device, configured to store a database; and
an audio receiver, configured to receive an audio signal;
a processing device, comprising:
a speech recognition engine, configured to identify a key speech pattern in the audio signal and generate a candidate vocabulary list and a transcode corresponding to the key speech pattern, wherein the transcode is a Roman Pinyin or a natural language pinyin; wherein the candidate vocabulary list comprises a candidate vocabulary corresponding to the key speech pattern and a vocabulary score corresponding to the candidate vocabulary; and
a determination module, configured to determine whether the vocabulary score is greater than a score threshold; and if the vocabulary score is greater than the score threshold, the determination module stores the candidate vocabulary corresponding to the vocabulary score in the database, if all of the vocabulary scores in the candidate vocabulary list are not greater than the score threshold, the determination module stores the transcode in the database;
wherein the vocabulary candidate list comprises a plurality of candidate vocabularies corresponding to the key speech pattern, and each of the candidate vocabularies corresponds to a specific vocabulary score, and the determination module determines whether at least one of the specific vocabulary scores is greater than the score threshold, and if the determination module determines that the at least one specific vocabulary score is greater than the score threshold, the determination module stores the candidate vocabulary corresponding to the maximum value of the at least one specific vocabulary score that is greater than the score threshold in the database.

2. The speech correction system of claim 1, wherein the processing device further comprises:
a comparison module, configured to receive another key speech pattern, and compare the other key speech pattern with the candidate vocabulary and the transcode in the database to generate a comparison result list; wherein the comparison result list comprises a plurality of comparison scores individually corresponding to the candidate vocabulary and the transcode.

3. The speech correction system of claim 2, wherein the determination module determines whether each of the comparison scores is greater than a comparison threshold, and outputs the candidate vocabulary or the transcode corresponding to the largest of the comparison scores that is greater than the comparison threshold.

4. A speech correction method, comprising:
receiving an audio signal, identifying a key speech pattern in the audio signal and generating a candidate vocabulary list and a transcode corresponding to the key speech pattern, wherein the transcode is a Roman Pinyin or a natural language pinyin; wherein the candidate vocabulary list comprises a candidate vocabulary corresponding to the key speech pattern and a vocabulary score corresponding to the candidate vocabulary; and
determining whether the vocabulary score is greater than a score threshold;
wherein if the vocabulary score is greater than the score threshold, the candidate vocabulary corresponding to the vocabulary score is stored, and if all of the vocabulary scores in the candidate vocabulary list are not greater than the score threshold, the transcode is stored in a database;
wherein the vocabulary candidate list comprises a plurality of candidate vocabularies corresponding to the key speech pattern, and each of the candidate vocabularies corresponds to a specific vocabulary score, and the speech correction method further comprises:
determining whether at least one of the specific vocabulary scores is greater than the score threshold, and if the at least one of the specific vocabulary scores is greater than the score threshold is determined, the candidate vocabulary corresponding to the maximum value of the at least one of the specific vocabulary scores that is greater than the score threshold is stored in the database.

5. The speech correction method of claim 4, wherein the transcode is a Roman Pinyin.

6. The speech correction method of claim 4, further comprising:
receiving another key speech pattern, and comparing the other key speech pattern with the candidate vocabulary and the transcode in the database to generate a comparison result list;
wherein the comparison result list comprises a plurality of comparison scores separately corresponding to the candidate vocabulary and the transcode.

7. The speech correction method of claim 6, further comprising:
determining whether each of the comparison scores is greater than a comparison threshold, and
outputting the candidate vocabulary or the transcode corresponding to the largest of the comparison scores that is greater than the comparison threshold.

* * * * *